United States Patent
Nomura et al.

(10) Patent No.: US 6,464,932 B1
(45) Date of Patent: Oct. 15, 2002

(54) UNBURNED CARBON-CONTAINING REFRACTORY MATERIAL AND VESSEL FOR MOLTEN METAL

(75) Inventors: Osamu Nomura; Yasuhiro Hoshiyama; Atsushi Torigoe, all of Tokyo (JP)

(73) Assignee: Shinagawa Refractories Co., Ltd., Tokyo (JP)

(*) Notice: Subject to any disclaimer, the term of this patent is extended or adjusted under 35 U.S.C. 154(b) by 0 days.

(21) Appl. No.: 09/555,359

(22) PCT Filed: Sep. 27, 1999

(86) PCT No.: PCT/JP99/05237

§ 371 (c)(1), (2), (4) Date: May 30, 2000

(87) PCT Pub. No.: WO00/18700

PCT Pub. Date: Apr. 6, 2000

(30) Foreign Application Priority Data

Sep. 30, 1998 (JP) .............................................. 10-278698

(51) Int. Cl.$^7$ ............................. C04B 35/00; C04B 35/22
(52) U.S. Cl. ....................... 266/275; 266/280; 266/286; 501/99; 501/101
(58) Field of Search ................................. 266/280, 283, 266/286, 275; 501/96, 99, 101

(56) References Cited

U.S. PATENT DOCUMENTS

| | | |
|---|---|---|
| 4,306,030 | 12/1981 | Watanabe et al. ............. 501/99 |
| 4,539,301 | 9/1985 | Kaneko et al. |
| 4,605,635 | 8/1986 | Zenbutsu et al. ............. 501/96 |

FOREIGN PATENT DOCUMENTS

| | | |
|---|---|---|
| DE | 31 49 485 A1 | 12/1981 |
| JP | 62-260768 | 11/1987 |
| JP | 402069349 A | 3/1990 |
| JP | 3-54155 | 3/1991 |
| JP | 4-310570 | 11/1992 |

*Primary Examiner*—Scott Kastler
(74) *Attorney, Agent, or Firm*—Sughrue Mion, PLLC

(57) ABSTRACT

An unburned carbon-containing refractory suitable for lining a molten metal container, which can prevent deformation of the outer steel shell, improve the life of the container, suppress reduction in molten steel temperature, and minimize energy losses without sacrificing the life of the wear lining. A molten metal container capable of reducing energy losses and having stable durability is also provided. The unburned carbon-containing refractory contains a refractory aggregate and 30% by weight or less of a carbon raw material containing at least graphite, wherein the carbon content X (% by weight) and the thermal conductivity $\lambda$(W/m° C.) of the refractory satisfy the relationship: $\lambda \leq 0.8X+7$, and the refractory contains 20 parts by weight or more of a refractory aggregate having an apparent porosity of 10% or smaller and a greater size than 1 mm per 100 parts by weight of the total of the refractory aggregate and the carbon raw material.

16 Claims, 1 Drawing Sheet

1: OUTER STELL SHELL
2: BACK LINING BRICK
3: BACK LINING BRICK
4: UNBURNED CARBON-CONTAINING REFRACTORY
5: MOLTEN STELL

1: OUTER STELL SHELL
2: BACK LINING BRICK
3: BACK LINING BRICK
4: UNBURNED CARBON-CONTAINING REFRACTORY
5: MOLTEN STELL

UNBURNED CARBON-CONTAINING REFRACTORY MATERIAL AND VESSEL FOR MOLTEN METAL

This application is a 371 of PCT/JP99/05237, filed on Sep. 27, 1999.

TECHNICAL FIELD

This invention relates to an unburned carbon-containing refractory suitable for lining a container for molten metal and, more particularly, to an unburned carbon-containing refractory suitable for lining a molten metal container, which can reduce the outer steel shell temperature of a molten metal container thereby making it possible to prevent deformation of the outer steel shell, to suppress a reduction in molten steel temperature, and the like, and a molten metal container.

BACKGROUND OF THE INVENTION

Carbon-containing refractories containing carbon, e.g., graphite, such as magnesia-carbon brick and alumina-carbon brick, have high durability owing to their excellent resistance to corrosion and oxidation and are now made great use of for wear lining various containers for transportation or for treatments (RH degassing, LF treatment, etc.), such as a torpedo car, a hot metal ladle, a converter, a ladle, a degasser, a holding furnace, an electric furnace, and the like, particularly those for iron & steel making.

In molten steel processing such as RH degassing and LF treatment, however, since molten steel holds in the container for a long time, the high thermal conductivity of carbon has given rise to such problems that the outer steel shell temperature increases, which can result in deformation of the outer steel shell or increase of thermal dissipation.

It will also increase the temperature drop of the molten metal while transported or processed, which results in a great loss of energy.

Further, the outer steel shell is apt to undergo deformation at elevated temperatures so that the durability of the container shell is reduced. The bottom of the container is similarly exposed to high temperature so that casting troubles due to deformation of the slide valve apparatus occur.

It has been one of the most important subjects to enhance energy efficiency to the possible maximum in iron & steel manufacture and nonferrous metal manufacture that are high-energy-consuming industries.

In regard to these problems, the following techniques have been disclosed to date. *Taikabutsu (Refractories)*, vol. 149, No. 10, pp. 574–575 (1997) discloses application of a microporous heat insulating material (thickness: 3 mm) to the side walls of a ladle to drop the outer steel shell temperature by about 55° C. However, application of back-up insulation to the side walls increases the cost of refractory lining. Having a large number of pores inside, the heat insulating material is not deemed to have high strength. Therefore the structure of the heat insulating material is liable to compressive deformation due to, for example, thermal expansion of the refractory upon receipt of molten steel to reduce its heat insulating properties and has difficulty in manifesting its effects continuously. The duration in which the heat insulating material works effectively is usually about equal to or twice the duration of wear refractory. When the heat insulating materials are exchanged, it is necessary to dismantle the back lining refractory. As a result, the back lining refractory, whose duration is usually 5 to 8 times that of wear refractory, comes to have a reduced duration to the same level of, or about twice as durable at the most as, wear refractory.

Further, where the heat insulating material is used, the heat that should have escaped through the outer steel shell would be confined in the refractory to increase the temperature of the whole refractory, causing reduction of refractory life (particular of wear refractory).

*Taikabutsu (Refractories)*, vol. 141, No. 7, pp. 365–370 (1989) proposes a method for improving the life of an outer steel shell of a converter, in which a blast cooling system is adopted to the wall and the lower corn of a converter, and a water cooling pipe system to the upper corn. However, this method cannot be applied to a ladle of LF processing from the standpoint of heat loss.

For the purpose of stress relaxation of a converter, etc. in high temperature, the generated stress is reduced by designing the lining taking the expansion of MgO—C brick into consideration. However, in case where the furnace is operated basically at high outer steel shell temperature, the outer steel shell temperature increases, and the problems of deformation and heat loss remain unsolved.

As stated above, the conventional techniques for reducing the outer steel shell temperature and thereby preventing deformation of the shell include introduction of a water cooling or air cooling system, application of a heat insulating material on the back side of the back lining brick, reduction of hot stress generation, and the like. However, they are not satisfactory from the standpoint of cost, duration of containers, and energy saving.

The present invention has been made in the light of the above-described problems. It is an object of the invention to provide a carbon-containing refractory suitable for lining a molten metal container which prevents deformation of the outer steel shell of the container, improve the furnace life, suppress a reduction in molten steel temperature, minimize energy losses, and secure the life of wear lining, and to provide a molten metal container lined with the carbon-containing refractory, which is capable of reducing energy losses and has stable durability.

The term "molten metal container" as used herein is intended to include various containers for transportation or for treatments (RH vacuum degassing equipment, LF treatment, etc.) of molten metal, such as a torpedo car, a hot metal ladle, a converter, a ladle, a degasser, a holding furnace, an electric furnace, and the like.

DISCLOSURE OF THE INVENTION

The present inventors have conducted extensive investigations on techniques for reducing energy losses from a molten metal container and techniques for not reducing durability such as resistance to corrosion, spalling, oxidation, etc. and, as a result, completed the present invention.

The present invention will be further described in detail.

Carbon-containing refractories which are currently employed for wear lining various melting furnaces have respective proper carbon contents for securing satisfactory durability in conformity to the respective conditions of use. That is, carbon-containing refractories having different carbon contents are used in accordance with the melting furnaces to which they are applied.

The recent development of techniques of production and material designing of carbon-containing refractories has provided high-density carbon-containing refractories.

High-density carbon-containing refractories have satisfactory durability against corrosion and oxidation but, on the other hand, allow the inner temperature to rise because of their high thermal conductivity. It follows that the outer steel shell temperature of the melting furnace increases, and thermal dissipation from both the melting furnace and the molten metal increases.

Under the present circumstances the high-density carbon-containing refractories now in use for various melting furnaces have a thermal conductivity $\lambda$(W/m° C.) ranging from about $0.8X+8<\lambda<0.8X+16$, wherein X is the carbon content of the refractories, while dependent on the kind of the refractory aggregate used.

The inventors have studied techniques of reducing energy losses from a molten metal container and found, as a result, that the object is accomplished by a carbon-containing refractory which contains 30% by weight or less, preferably 1% to 20% by weight, of a carbon raw material comprising at least graphite, and whose carbon content X wt % and whose thermal conductivity $\lambda$(W/m° C.) satisfy the relationship: $\lambda \leq 0.8X+7$. The present invention has thus been reached.

The inventors have also studied techniques for reducing energy losses from a molten metal container without reducing the durability such as resistance to corrosion, spalling, oxidation and the like and recognized, as a result, that the object is accomplished by a carbon-containing refractory which contains 30% by weight or less, of a carbon raw material comprising at least graphite, whose carbon content X wt % and whose thermal conductivity $\lambda$(W/m° C.) satisfy the relationship: $\lambda \leq 0.8X+7$, and which contain 20 parts by weight or more of a refractory aggregate having an apparent porosity of 10% or smaller and a greater size than 1 mm per 100 parts by weight of the total of the refractory aggregate and the carbon raw material. The present invention has thus been reached.

These techniques have now provided a carbon-containing refractory which is highly dense and yet capable of reducing energy losses from a molten metal container to which it is applied.

In particular, it has been found that the carbon-containing refractory containing 1% to 20% by weight of a carbon raw material comprising at least graphite has its thermal conductivity reduced by 10% to 30% or even more as compared with a conventional carbon-containing refractory having an equal carbon content and that a molten metal container lined therewith has the back side temperature of its carbon-containing refractory brick reduced by 100 to 150° C. and its outer steel shell temperature reduced to 500° C. or lower and thus established a further improved invention.

That is, the gist (particulars specifying the invention) of the invention lies in:
(1) an unburned carbon-containing refractory containing a refractory aggregate and 30% by weight or less of a carbon raw material comprising at least graphite, which is characterized in that the carbon content X (% by weight) and the thermal conductivity $\lambda$(W/m° C.) of the refractory satisfy the relationship: $\lambda \leq 0.8X+7$, and the refractory contains 20 parts by weight or more of a refractory aggregate having an apparent porosity of 10% or smaller and a greater size than 1 mm per 100 parts by weight of the total of the refractory aggregate and the carbon raw material.

The gist (particulars specifying the invention) of the invention also lies in:
(2) an unburned carbon-containing refractory containing a refractory aggregate comprising 50% by weight or more of a magnesia raw material and 30% by weight or less of a carbon raw material comprising at least graphite, which is characterized in that the carbon content X (% by weight) and the thermal conductivity $\lambda$(W/m° C.) of the refractory satisfy the relationship: $\lambda \leq 0.8X+7$, and the refractory contains 20 parts by weight or more of a refractory aggregate having an apparent porosity of 6% or smaller and a greater size than 1 mm per 100 parts by weight of the total of the refractory aggregate and the carbon raw material.

The gist (particulars specifying the invention) of the invention also resides in:
(3) an unburned carbon-containing refractory containing a refractory aggregate comprising 50% by weight or more of an alumina raw material whose alkali content is not more than 1% by weight and 30% by weight or less of a carbon raw material comprising at least graphite, which is characterized in that the carbon content X (% by weight) and the thermal conductivity $\lambda$(W/m° C.) of the refractory satisfy the relationship: $\lambda \leq 0.8X+5$, and the refractory contains 20 parts by weight or more of a refractory aggregate having an apparent porosity of 10% or smaller and a greater size than 1 mm per 100 parts by weight of the total of the refractory aggregate and the carbon raw material.

The unburned carbon-containing refractory according to the invention as set forth above is characterized in that:
(4) the carbon raw material comprising at least graphite is present in an amount of 1% to 20% by weight.

The gist (particulars specifying the invention) of the invention also resides in:
(5) a molten metal container characterized in that any of the above-described unburned carbon-containing refractory is used at least partly as the wear lining.

The gist (particulars specifying the invention) of the invention also lies in:
(6) a molten metal container characterized in that any of the above-described unburned carbon-containing refractory is used at least partly as the wear lining, and the outer steel shell temperature is 500° C. or lower.

The gist (particulars specifying the invention) of the invention also lies in:
(7) a molten metal container characterized in that any of the above-described unburned carbon-containing refractory is used at least partly as the wear lining without having back-up insulation on the back side thereof, and the outer steel shell temperature is 500° C. or lower.

The gist (particulars specifying the invention) of the invention also lies in:
(8) a molten metal container characterized in that any of the above-described unburned carbon-containing refractory is used at least partly as the wear lining, the carbon content X (% by weight) and the thermal conductivity $\lambda$(W/m° C.) of the refractory satisfy the relationship: $\lambda \leq 0.8X+7$, and the outer steel shell temperature is 500° C. or lower.

The gist (particulars specifying the invention) of the invention also consists in:
(9) a molten metal container characterized in that any of the above-described unburned carbon-containing refractory is used at least partly as the wear lining without having back-up insulation on their back side, the carbon content X (% by weight) and the thermal conductivity $\lambda$(W/m° C.) of the refractory satisfy the relationship: $\lambda \leq 0.8X+7$, and the outer steel shell temperature is 500° C. or lower.

BEST MODE FOR CARRYING OUT THE INVENTION

Figure 1:
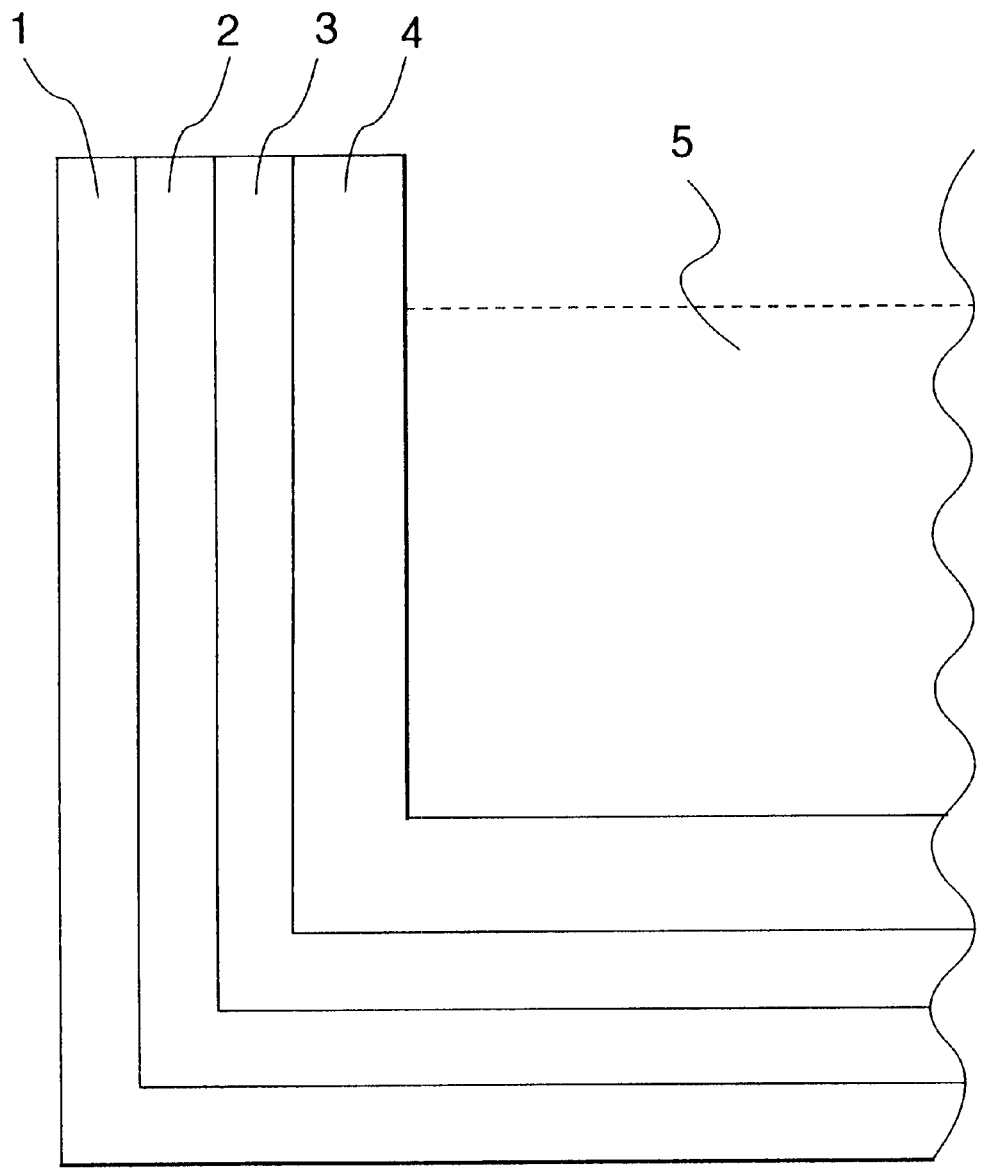
FIG. 1 is a partial cross section of a molten metal container to which the unburned carbon-containing refractory of the invention are applied as a wear lining material, wherein numeral 1 is an outer steel shell; 2 and 3, back lining bricks; 4, unburned carbon-containing refractory as wear lining; and 5, molten steel.

The present invention relates to an unburned carbon-containing refractory comprising a refractory aggregate and 30% by weight or less (preferably 20% by weight or less) of a carbon raw material comprising at least graphite, which is characterized in that the carbon content X (% by weight) and the thermal conductivity $\lambda$(W/m° C.) of the refractory satisfy the relationship: $\lambda \leq 0.8X+7$, and the refractory contains 20 parts by weight or more of a refractory aggregate having an apparent porosity of 10% or smaller and a greater size than 1 mm per 100 parts by weight of the total of the refractory aggregate and the carbon raw material.

The present invention is characterized by the use, as a wear lining material of a molten metal container, an unburned carbon-containing refractory comprising a refractory aggregate and 30% by weight or less (preferably 20% by weight or less) of a carbon raw material comprising at least graphite, wherein the carbon content X (% by weight) and the thermal conductivity $\lambda$(W/m° C.) of the refractory satisfy the relationship: $\lambda \leq 0.8X+7$.

The subject matter of the present invention is the use of carbon-containing refractory having a reduced thermal conductivity so as to control a temperature rise within the lining thereby to reduce the outer steel shell temperature and to reduce thermal dissipation from the melting furnace and the molten metal.

In particular, the use of the carbon-containing refractory whose thermal conductivity is lower by 10% to 30% or even more than that of a conventional carbon-containing refractory having an equal carbon content makes it possible to suppress the temperature rise within the lining so that the back side temperature of the carbon-containing refractory brick can be reduced by about 100 to 150° C. As a result, the outer steel shell temperature can be reduced to 500° C. or lower. Thus the outer steel shell can be prevented from being deformed, and thermal dissipation from the molten metal container and the molten metal can be reduced.

The use of the carbon-containing refractory having a reduced thermal conductivity makes it feasible to lower the outer steel shell temperature of a molten metal container to 500° C. or lower by taking into consideration, as has been conventionally followed, the thermal-conductivity and thickness of wear lining refractory, the thermal conductivity and thickness of back lining refractory, and the like.

The outer steel shell temperature is preferably reduced to 400° C. or lower, still preferably 380° C. or lower.

In order for the carbon-containing refractory of the invention to be used as a refractory for a molten metal container, the carbon content X wt % and the thermal conductivity $\lambda$(W/m° C.) of the refractory should satisfy the relationship: $\lambda \leq 0.8X+7$.

If $\lambda$ is greater than $(0.8X+7)$, the temperature within the lining would elevate to increase the outer steel shell temperature of the molten metal container, resulting in increased thermal dissipation from the molten metal container and the molten metal.

In order that the carbon content X wt % and thermal conductivity $\lambda$(W/m° C.) of the carbon-containing refractory can satisfy the relationship: $\lambda \leq 0.8X+7$, it is necessary to use, for example, (1) graphite comprising a carbon raw material coated with ultrafine particles having a smaller thermal conductivity than carbon (e.g., ultrafine particles of alumina or magnesia), (2) graphite comprising a carbon raw material having formed thereon a layer having a smaller thermal conductivity than carbon, (3) graphite having been made into flakes along the c-axis of graphite crystals by, for example, acid treatment, or (4) graphite having a small particle size. The graphite content in the carbon raw material is at least 30% by weight, preferably 50% by weight.

Values of thermal conductivity $\lambda$ are roughly divided into those measured at room temperature and those measured while hot. Since the carbon-containing refractory of the invention is used in high temperature, hot measured values have meaning. The thermal conductivity $\lambda$ as adopted herein are values measured at 600° C. for the following reason. Since the carbon-containing refractory of the invention is an unburned product, carbonization of organic matter thereof, such as resins used as a binder, would be in progress in temperatures between 200 and 500° C., which makes it difficult to read a precise hot thermal conductivity. At or above 500° C., the organic binder has been carbonized almost completely, and the thermal conductivity does not show appreciable fluctuations any more. Therefore, the hot thermal conductivity can be represented by the value measured at 600° C.

Therefore, the thermal conductivity value $\lambda$ used in the present invention denotes the value representing the hot characteristics at 500° C. or higher.

The refractory aggregate which can be used in the invention is not particularly limited, and oxides, such as magnesia, alumina, spinel, calcia, dolomite, zirconia, and silica, and non-oxides, such as silicon carbide, boron carbide, and zirconium boride, can be used. In general a magnesia raw material and an alumina raw material are frequently used as a refractory aggregate in the carbon-containing refractory.

The magnesia raw material used in the invention can be either an electrofused product or a sintered product. To obtain high anticorrosion, those having a purity of 95% by weight or higher are preferred.

The impurity in the magnesia raw material preferably has a composition of $CaO/SiO_2 \geq 2$ for application to converters and the like, especially converters which are always used with high-basicity slag. Where used in the presence of high-basicity slag, magnesia has a low rate of dissolution because of its excellent resistance to corrosion. Therefore, the composition of crystal boundary where impurities are concentrated largely influences the durability of refractory. That is, where $CaO/SiO_2$ is smaller than 2, the crystal boundary will have a low melting point and produce a liquid phase in high temperature so that periclase crystals easily run out, which is unfavorable.

The alumina raw material which can be used in the invention can be any of electrofused alumina, sintered alumina and naturally occurring alumina. A preferred purity is 50% by weight or higher. For securing sufficient anticorrosion, the alumina raw material is required to have a small alkali content, desirably 1% by weight or smaller.

In case where a magnesia raw material is used as a refractory aggregate in an amount of 50% by weight or more, it is still preferred for reduction of thermal dissipation that the carbon content X wt % and the thermal conductivity $\lambda$(W/m° C.) of the carbon-containing refractory satisfy the relationship: $\lambda \leq 0.8X+7$. Where $\lambda \leq 0.8X+7$, the outer steel shell temperature of a molten metal container can be reduced to 500° C. or lower, preferably 400° C. or lower, still preferably 380° C. or lower.

In case where an alumina raw material is used as a main refractory aggregate, the resulting carbon-containing refractory tends to have a low thermal conductivity because the alumina raw material has a relatively low thermal conductivity. Hence, where an alumina raw material is used as a refractory aggregate in an amount of 50% by weight or more, it is preferred for reduction of thermal dissipation that the carbon content X wt % and the thermal conductivity $\lambda$(W/m° C.) of the carbon-containing refractory satisfy the relationship: $\lambda \leq 0.8X+5$. Where $\lambda \leq 0.8X+5$, the outer steel shell temperature of a molten metal container can be reduced to 500° C. or lower, preferably 400° C. or lower, still preferably 380° C. or lower.

The carbon raw material content in the carbon-containing refractory of the invention is preferably 30% by weight or less. If it exceeds 30% by weight, oxidation damage becomes large to reduce the durability, and the thermal conductivity increases, resulting in a failure to achieve the object of the invention, i.e., reduction of thermal dissipation of a melting furnace. In this sense, a still preferred carbon raw material content is 20% by weight or less.

For application to those containers having a long molten steel holding time, such as ladles and RH vacuum degassing equipment, it is preferred that the carbon raw material content be still smaller, particularly be less than 17% by weight, in order to minimize the thermal dissipation.

While the lower limit of the carbon raw material content is not particularly limited, it is desirable for the carbon-containing refractory to have a carbon raw material content of 1% by weight or more for obtaining the effect of carbon in suppressing corrosion by slag.

In the present invention it is necessary to use, as a carbon raw material, graphite having a coating of ultrafine particles having a smaller thermal conductivity than carbon (e.g., alumina or magnesia), graphite comprising a carbon raw material having formed thereon a layer having a smaller thermal conductivity than carbon, graphite having been made into flakes along the c-axis of graphite crystals by, for example, acid treatment, graphite having a small particle size, and the like. If desired, other graphite species are also employable. The amount of the other graphite species is 10% to 70% by weight, preferably 10% to 50% by weight, in the total carbon raw material.

Satisfactory packing properties can be obtained by using graphite. Further, graphite, being crystalline carbon, has excellent resistance to corrosion and oxidation to provide a carbon-containing refractory having satisfactory resistance to oxidation and corrosion.

The carbon-containing refractory of the invention should have an apparent porosity of 10% or less. If the apparent porosity exceeds 10%, the refractory has low packing properties to have reduced resistance to corrosion and oxidation, resulting in reduced durability.

Well-known means can be adopted to make the apparent porosity 10% or less. For example, raw materials are mixed up together with a binder having moderate lubricity to prepare a molding material having good pressure-transmission, which is pressed to have adjusted denseness.

Where a refractory aggregate mainly comprising a magnesia raw material is used, since a magnesia raw material has a relatively low porosity, the resultant carbon-containing refractory tends to have a low apparent porosity. Accordingly, where a magnesia raw material is used in an amount of 50% by weight or more, the apparent porosity is still preferably 6% or less for securing satisfactory durability.

Where a refractory aggregate mainly comprising an alumina raw material is used, it is necessary that the resulting carbon-containing refractory has an apparent porosity of 10% or less.

In case where a refractory has a low thermal conductivity, there would be a wide temperature distribution in the refractory when they are exposed to severe temperature change. It follows that the thermal stress due to thermal strain increases, tending to cause spalling damage.

In order to overcome this problem, it is necessary in the invention to disperse a certain amount or more of coarse aggregate grains having a certain size or greater sizes. In general, cracks initiated in a carbon-containing refractory structure by thermal stress, etc. destroy the refractory while extending in the matrix having much carbon dispersed therein. With coarse grains of a refractory aggregate being dispersed in the carbon-containing refractory structure with a moderate frequency, when a crack having been propagating and extending reaches the coarse grain, the force of propagation is lessened by the interference effect of the coarse grain, whereby crack extension can be suppressed.

To produce such an effect, the carbon-containing refractory of the invention is required to contain 20 parts by weight or more of a refractory aggregate greater than 1 mm per 100 parts by weight of the total of the refractory aggregate and the carbon raw material. If the amount of the coarse grains is less than 20 parts by weight, the above-mentioned effects in suppressing spalling damage are not obtained sufficiently. To obtain more sufficient effects, it is still preferred for the carbon-containing refractory to contain 30 parts by weight or more of a refractory aggregate greater than 1 mm per 100 parts by weight of the total of the refractory aggregate and the carbon raw material.

While the upper limit of the content of the refractory aggregate greater than 1 mm is not particularly specified, it is preferably 70 parts by weight or less for forming a satisfactory structure.

The use of a refractory aggregate having the specific particle size produces such a marked effect that a carbon-containing refractory having a reduced thermal conductivity can be assured of sufficient spalling resistance without suffering from deterioration of denseness and anticorrosion.

The structure of various containers lined with the unburned carbon-containing refractory of the invention is described with reference to the drawing. As shown in FIG. 1, the container for molten steel 5, e.g., a ladle for LF processing, comprises an outer steel shell 1, back lining bricks 2 and 3, and wear lining 4 comprising the unburned carbon-containing refractory.

EXAMPLES

The present invention will now be illustrated more concretely by way of Examples and Comparative Examples, but it should be understood that the invention is not deemed to be limited thereto.

Examples 1 to 7 and Comparative Examples 1 to 6

A refractory aggregate comprising an electrofused material shown in FIG. 1, scaly graphite A having a purity of 90% or graphite B obtained by making graphite A into flakes and coating the flakes with ultrafine powder (20 μm or smaller) of a refractory aggregate (alumina or magnesia), and other raw materials shown in Table 2 were blended, kneaded in a pressure kneader, and formed. The formed bodies were heat treated at 200° C. for 12 hours to prepare samples of unburned carbon-containing refractory.

Each sample was subjected to the following evaluation tests.

Oxidation Resistance Test

The sample was heated in the air at 1300° C., and the thickness of the decarburized layer (mm) was measured.

Corrosion Resistance Test

The samples of Examples 1 and 2 and Comparative Examples 1 and 2 were subjected to a slag resistance test at 1400° C. by using slag having a basicity of 2, and the depth of corrosion (mm) was measured. Other samples were subjected to a slag resistance test at 1650° C. by using slag having a basicity of 3.8, and the depth of corrosion (mm) was measured.

Spalling Resistance Test

The sample was dipped in molten pig iron to be given a thermal shock, and the number of initiated cracks observed on a cut area was measured and digitized.

Outer Steel Shell Temperature

A lining model was prepared, with the wear lining thickness simulated for the melting furnace shown in Table 2. The lined shell was exposed to a given molten steel temperature and a given outside temperature, and stationary heat transfer analysis was performed to obtain the outer steel shell temperature.

TABLE 1

| Chemical Composition | Alumina Raw Material (wt %) | Magnesia Raw Material (wt %) |
|---|---|---|
| $Al_2O_3$ | 94.7 | 0.1 |
| MgO | 0.2 | 98.3 |
| $SiO_2$ | 1.2 | 0.4 |
| CaO | 0.3 | 0.9 |
| $Fe_2O_3$ | 0.1 | 0.2 |
| $Na_2O$ | 0.4 | — |
| $K_2O$ | 0.1 | — |

TABLE 2

| | Ex. 1 | Comp. Ex. 1 | Ex. 2 | Comp. Ex. 2 | Ex. 3 | Comp. Ex. 3 | Ex. 4 | Comp. Ex. 4 | Ex. 5 | Ex. 6 | Comp. Ex. 5 | Ex. 7 | Comp. Ex. 6 |
|---|---|---|---|---|---|---|---|---|---|---|---|---|---|
| Material | | | | | | | | | | | | | |
| Alumina; >3 mm | 10 | 10 | 5 | | | | 5 | 5 | | | | | |
| Alumina; 1–3 mm | 30 | 30 | 25 | 10 | | | 20 | 20 | | | | | |
| Alumina; <1 mm | 30 | 30 | 40 | 60 | | | 57 | 57 | | | | | |
| Magnesia; >3 mm | | | | | 5 | 5 | 5 | 5 | 10 | 20 | | 10 | 10 |
| Magnesia; 1–3 mm | | | | | 35 | 35 | 5 | 5 | 35 | 35 | 15 | 50 | 50 |
| Magnesia; <1 mm | | | | | 40 | 40 | | | 43 | 40 | 73 | 34 | 34 |
| Silicon Carbide | 15 | 15 | 15 | 15 | | | | | | | | | |
| Graphite B* | 10 | | 15 | | 20 | | 6 | | 12 | 15 | | 3 | |
| Graphite A | | | | 15 | | 20 | | 6 | | | 12 | | |
| Coke | 5 | 15 | | | | | 2 | 2 | | | | 3 | 6 |
| Aluminum | 2 | 2 | 2 | 2 | 3 | 3 | 3 | 3 | 5 | 3 | 5 | 1 | 1 |
| Binder | 4 | 6 | 3 | 3 | 3 | 3 | 3.5 | 3.5 | 3 | 3 | 3 | 2.5 | 4 |
| Physical Properties | | | | | | | | | | | | | |
| Apparent Porosity (%) | 7 | 13 | 6 | 6 | 4 | 4 | 6 | 6 | 5 | 4 | 7 | 5 | 8 |
| Thermal Conductivity (W/m · ° C.) | 11 | 8 | 13 | 18 | 18 | 26 | 8 | 14 | 10 | 16 | 17 | 7 | 10 |
| Test Results | | | | | | | | | | | | | |
| Oxidation Resistance | 3.5 | 6.5 | 3.0 | 3.0 | 3.5 | 3.5 | 2.0 | 2.0 | 2.0 | 3.0 | 3.0 | 3.0 | 6.0 |
| Corrosion Resistance | 6.0 | 10.0 | 5.0 | 5.5 | 4.5 | 4.5 | 8.5 | 9.0 | 3.5 | 3.5 | 4.0 | 3.0 | 7.0 |
| Spalling Resistance | 3.0 | 3.5 | 3.0 | 8.0 | 7.5 | 7.5 | 5.0 | 5.5 | 9.5 | 7 | 16.5 | 8.5 | 9.0 |
| Melting Furnace | torpedo car | torpedo car | hot metal ladle | hot metal ladle | converter | Converter | ladle | ladle | ladle | ladle | ladle | RH lower tank | RH lower tank |
| Wear Lining Thickness (mm) | 400 | 400 | 300 | 300 | 600 | 600 | 250 | 250 | 250 | 250 | 250 | 350 | 350 |
| Outer Shell Temp. (° C.) | 270 | 250 | 280 | 330 | 250 | 320 | 340 | 420 | 380 | 400 | 460 | 300 | 340 |

Note:
*Alumina ultrafine particles were used in Examples 1, 2 and 4 and Comparative Examples 1, 2 and 4.
Magnesia ultrafine particles were used in others.

It is apparent from Table 2 that the carbon-containing refractory according to the present invention exhibits excellent characteristics in corrosion resistance, spalling resistance and oxidation resistance simultaneously and, when applied to various molten metal containers, produce an effect in reducing the outer steel shell temperature.

Accordingly, the carbon-containing refractory of the present invention obviously possesses the following characteristics.

(1) They have markedly excellent effects in reducing energy losses in use while exhibiting, at the same time, excellent durability against corrosion, spalling and oxidation.

(2) There is provided an excellent lining material for molten metal containers which satisfies both requirements of excellent durability and energy loss reduction that have been very difficult to achieve.

(3) They are of high industrial value in that their use will contribute to greater energy saving in iron & steel manufacture and nonferrous metal manufacture that are high-energy-consuming industries Example 8 and Comparative Example 7

Containers having the structure shown in FIG. 1 were constructed by lining a 60-ton ladle for LF process which is now in general use with the MgO—C brick of Example 6 shown in Table 2 above or, for comparison, conventional unburned carbon-containing refractory (having the same composition as that of Example 6, except for containing no graphite) to the lining thickness shown in Table 3. In both containers high-alumina brick was applied for backing-up.

The thermal conductivity and carbon content of the wear lining unburned carbon-containing refractory used in the container of the invention and the comparative container are shown in Table 4. Further, the molten steel temperature and the outer temperature being set at 1650° C. and 30° C., respectively, stationary heat transfer analysis was performed in a usual manner. The results of the calculations are shown in Table 5.

TABLE 3

|  | Example 8 Lining Thickness (mm) | Comparative Example 7 Lining Thickness (mm) |
|---|---|---|
| MgO-C Brick of Invention | 180 | — |
| Comparative MgO-C Brick | — | 180 |
| High-alumina Brick[1] | 65 | 65 |
| High-alumina Brick[2] | 25 | 25 |
| Outer Steel Shell | 25 | 25 |

Note:
[1] Back lining brick 3 of FIG. 1 Back lining brick 2 of FIG. 1

TABLE 4

|  | Example 8 MgO-C Brick of Invention | Comparative Example 7 Comparative Mg-C Brick |
|---|---|---|
| Thermal Conductivity (W/m ° C.) at 600° C. | 16 | 22 |
| Carbon Content (%) | 15 | 15 |

TABLE 5

|  | Example 8 | Comparative Example 7 |
|---|---|---|
| Surface Temperature of MgO-C Brick | 1635° C. | 1632° C. |
| Back Side Temperature of MgO-C Brick | 1271° C. | 1387° C. |
| Surface Temperature of High-alumina Brick[1] on Outer Steel Shell Side | 748 | 824 |
| Surface Temperature of High-alumina Brick[2] on Outer Steel Shell Side | 490 | 580 |
| Surface Temperature of Outer Steel Shell | 485 | 522 |

Note:
[1] Back lining brick 3 of FIG. 1 Back lining brick 2 of FIG. 1

The results of the stationary heat transfer analysis clearly reveal the following facts.

The back side temperature of the conventional MgO—C brick in the comparative container was 1387° C., while that of the low-heat conductive MgO—C brick in the container of the invention was 1271° C., proving that the back side temperature of wear lining refractory is reduced by 116° C. by using the low thermal conductive MgO—C brick of the invention as compared with the conventional MgO—C wear lining brick. This is also effective to improve the durability of the back lining brick.

The outer steel shell temperature of the comparative container was 522° C., whereas that of the container of the invention was 485° C., indicating that it is possible to reduce the outer steel shell temperature by about 40° C. Thus, application of the low-heat conductive MgO—C brick of the invention makes it feasible to prevent deformation of the outer steel shell and to reduce the thermal dissipation from the outer shell side.

The container of the invention has a reduced thermal conductivity in its wear lining so that storage of heat from the molten steel in the wear lining refractory can be reduced, which contributes to suppression of reduction in molten steel temperature.

Examples hereinafter given present practical application of the unburned carbon-containing refractory of the invention to actual furnaces having the structure shown in FIG. 1.

Example 9

The outer steel shell 1 of a 100-ton ladle of LF process was lined with high-alumina brick and magnesia-chrome brick as back lining bricks 2 and 3, and MgO—C brick 4 of Example 5 shown in Table 2 above were further applied thereon to a lining thickness of 200 mm to construct a container of the invention. The outer steel shell temperature measured was 320° C.

Example 10

The outer steel shell 1 of a 25-ton ladle of LF process was lined with roseki brick and MgO—C brick as back lining bricks 2 and 3, and MgO—C brick 4 of Example 5 shown in Table 2 above were applied thereon to a lining thickness of 150 mm to construct a container of the invention. The outer steel shell temperature measured was 330° C.

Example 11

The outer steel shell 1 of a 100-ton ladle of LF process was lined with roseki brick and MgO—C brick as back lining bricks 2 and 3, and MgO—C brick of Example 6 shown in Table 2 above were applied thereon as wear lining 4 to a lining thickness of 200 mm to construct a container of the invention. The outer steel shell temperature measured was 440° C.

The results of the practice on actual furnaces provide confirmation of the excellent effects produced by applying the unburned carbon-containing refractory of the present invention to lining such that the average outer steel shell temperature in these furnaces was 320° C., 330° C., and 440° C., respectively, indicating resolution of the deformation problem of the outer steel shell, and that the containers were equal to those lined with conventional unburned carbon-containing refractory in durability in terms of not only outer steel shell temperature but other attributes.

In Example 9, the following effects were confirmed.
The LF treating time can be shorted by about 10% in actual operation.
The amount of electric power consumed was reduced by about 10%, indicating an energy saving effect.
In allowing the ladle of LF process to cool, improvement was observed in the heat insulating properties, indicating an effect on suppression of a reduction in molten steel temperature.
Suppression of a reduction in molten steel temperature leads to an effect in reducing the temperature of the molten steel in tapping from the electric furnace.

Industrial Applicability

The present invention achieves the following excellent effects.

There is provided an unburned carbon-containing refractory comprising a refractory aggregate and 30% by weight or less of a carbon raw material comprising at least graphite, which accomplishes reduction of energy losses without suffering from deterioration of important characteristics essential to refractory, such as corrosion resistance, spalling resistance, and oxidation resistance, by specifying that the carbon content X wt % and the thermal conductivity $\lambda$(W/m° C.) of the refractory satisfy the relationship: $\lambda \leq 0.8X+7$ and by incorporating 20 parts by weight or more of a refractory aggregate having an apparent porosity of 10% or smaller and a greater size than 1 mm per 100 parts by weight of the total of the refractory aggregate and the carbon raw material.

A molten metal container with which energy losses can be extenuated and which has stable durability is provided by using the above-described unburned carbon-containing refractory.

A molten metal container whose outer steel shell temperature can be reduced to 500° C. or lower, with which energy losses can be reduced, and whose outer steel shell is less susceptible to damages is provided by using, as at least a part of wear lining, a carbon-containing refractory whose carbon content X wt % and whose thermal conductivity $\lambda$(W/m° C.) satisfy the relationship: $\lambda \leq 0.8X+7$ without using back-up insulation.

What is claimed is:

1. An unburned carbon-containing refractory comprising a refractory aggregate and 30% by weight or less of a carbon raw material comprising at least graphite, which is characterized in that the carbon content X (% by weight) and the thermal conductivity $\lambda$(W/m° C.) of said refractory satisfy the relationship: $\lambda \leq 0.8X+7$, and said refractory contains 20 parts by weight or more of a refractory aggregate having an apparent porosity of 10% or smaller and a greater size than 1 mm per 100 parts by weight of the total of the refractory aggregate and the carbon raw material.

2. An unburned carbon-containing refractory comprising a refractory aggregate comprising 50% by weight or more of a magnesia raw material and 30% by weight or less of a carbon raw material comprising at least graphite, which are characterized in that the carbon content X (% by weight) and the thermal conductivity $\lambda$(W/m° C.) of said refractory satisfy the relationship: $\lambda \leq 0.8X+7$, and said refractory contains 20 parts by weight or more of a refractory aggregate having an apparent porosity of 6% or smaller and a greater size than 1 mm per 100 parts by weight of the total of the refractory aggregate and the carbon raw material.

3. An unburned carbon-containing refractory comprising a refractory aggregate comprising 50% by weight or more of an alumina raw material whose alkali content is not more than 1% by weight and 30% by weight or less of a carbon raw material comprising at least graphite, which is characterized in that the carbon content X (% by weight) and the thermal conductivity $\lambda$(W/m° C.) of said refractory satisfy the relationship: $\lambda \leq 0.8X+5$, and said refractory contains 20 parts by weight or more of a refractory aggregate having an apparent porosity of 10% or smaller and a greater size than 1 mm per 100 parts by weight of the total of the refractory aggregate and the carbon raw material.

4. An unburned carbon-containing refractory as set forth in any one of claims 1 to 3, characterized in that the carbon raw material comprising at least graphite is present in an amount of 1% to 20% by weight.

5. A molten metal container characterized in that an unburned carbon-containing refractory as set forth in any one of claims 1 to 3 is used at least partly as a wear lining thereof.

6. A molten metal containing characterized in that an unburned carbon-containing refractory as set forth in any one of claims 1 to 3 is used at least partly as a wear lining thereof, and the outer steel shell temperature is 500° C. or lower.

7. A molten metal container characterized in that an unburned carbon-containing refractory as set forth in any one of claims 1 to 3 is used at least partly as a wear lining thereof without having a back-up insulation on their back side, and the outer steel shell temperature is 500° C. or lower.

8. A molten metal container characterized in that an unburned carbon-containing refractory is used at least partly as a wear lining thereof, the carbon content X (% by weight) and the thermal conductivity $\lambda$(W/m° C.) of said refractory satisfy the relationship: $\lambda \leq 0.8X+7$, and the outer steel shell temperature is 500° C. or lower.

9. A molten metal container characterized in that an unburned carbon-containing refractory is used at least partly as a wear lining thereof without having a back-up insulation on their back side, the carbon content X (% by weight) and the thermal conductivity $\lambda$(W/m° C.) of said refractory satisfy the relationship: $\lambda \leq 0.8X+7$, and the outer steel shell temperature is 500° C. or lower.

10. A molten metal container characterized in that an unburned carbon-containing refractory as set forth in claim 4 is used at least partly as a wear lining thereof.

11. A molten metal containing characterized in that an unburned carbon-containing refractory as set forth in claim 4 is used at least partly as a wear lining thereof, and the outer steel shell temperature is 500° C. or lower.

12. A molten metal container characterized in that an unburned carbon-containing refractory as set forth in claim 4 is used at least partly as a wear lining thereof without having a back-up insulation on their back side, and the outer steel shell temperature is 500° C. or lower.

13. An unburned carbon-containing refractory as set forth in any one of claims 1 to 3, wherein the graphite for the carbon raw material is coated with ultrafine particles of alumina or magnesia.

14. A molten metal container characterized in that an unburned carbon-containing refractory as set forth in claim 13 is used at least partly as a wear lining thereof.

15. A molten metal containing characterized in that an unburned carbon-containing refractory as set forth in claim 13 is used at least partly as a wear lining thereof, and the outer steel shell temperature is 500° C. or lower.

16. A molten metal container characterized in that an unburned carbon-containing refractory as set forth in claim 13 is used at least partly as a wear lining thereof without having a back-up insulation on their back side, and the outer steel shell temperature is 500° C. or lower.

* * * * *